US005179733A

United States Patent [19]

Matsui

[11] Patent Number: 5,179,733

[45] Date of Patent: Jan. 12, 1993

[54] WRISTWATCH BAND WITH RADIO ANTENNA

[75] Inventor: Shigeru Matsui, Nagano, Japan

[73] Assignee: Seiko Epson Corporation, Japan

[21] Appl. No.: 836,171

[22] Filed: Feb. 12, 1992

Related U.S. Application Data

[63] Continuation of Ser. No. 513,058, Apr. 23, 1990.

[51] Int. Cl.[5] .......................... H04B 1/06; H04B 1/08

[52] U.S. Cl. .................................... 455/344; 455/347; 455/351; 368/282

[58] Field of Search ................. 455/90, 347, 351, 344, 455/348, 349; 343/702, 718; 368/282

[56] References Cited

U.S. PATENT DOCUMENTS 4,847,818 7/1989 Olsen .................................... 455/90
4,884,252 11/1989 Teodoridis et al. .
4,897,835 1/1990 Gaskill .............................. 370/94.1
4,922,260 5/1990 Gaskill ............................... 343/718
4,977,614 12/1990 Kurcbart ............................ 455/351
5,014,041 5/1991 Weaver et al. ...................... 340/572

*Primary Examiner*—Reinhard J. Eisenzopf
*Assistant Examiner*—Christine Belzer
*Attorney, Agent, or Firm*—Marger, Johnson, McCollom & Stolowitz

[57] ABSTRACT

A wristband with an internal antenna for a wristwatch-receiver has first and second band portions each adapted for coupling at first ends thereof to a receiver housing and an adjustable clasp for coupling opposed, second ends thereof to one another to encircle a wearer's wrist. The band portions include conductive metal strips within an insulative covering and mechanically and electrically coupled at one end to the receiver housing. The clasp is adjustably positioned on one band portion and includes a clampable/releasable conductive protrusion for electrically contacting segments of the metal strip exposed through openings in a portion of the insulative covering to form a continuous conductive loop within the wristband. The inner side of the band has a grid pattern of transverse and longitudinal ridges.

20 Claims, 2 Drawing Sheets

WRISTWATCH BAND WITH RADIO ANTENNA

This is a continuation of application Ser. No. 07/513,058 filed Apr. 23, 1990.

BACKGROUND OF THE INVENTION

The present invention relates to wristwatch bands and more particularly to wristbands that include a radio antenna for receiving radio signals.

The design and manufacture of conventional wristwatch bands is a well-developed art. Recently, however, electronics technology has developed to the point that it is possible to include a radio receiver in a wristwatch-like device. Such radio receivers require an antenna, and it has been found desirable to include the radio antenna in the wristband.

Such a radio receiver with an associated wristband antenna is shown in U.S. Pat. No. 4,713,808 (Gaskill). Other wristwatch-like devices that have associated radio antennas are shown in European Patent 339482 (Teodoridis), Japanese Patent 6446325 (assigned to NEC Corp), and Japanese Patent 63252002 (assigned to Epson Corp).

A wristband for a wrist-mounted radio receiver must satisfy a variety of functional and aesthetic requirements. First, it must implement the general functional and aesthetic features of conventional watch bands, such as adjustability, comfort and appearance. Second, it must be capable of functioning reliably as a loop antenna in the environment of a wearer's wrist. Many aspects of the latter requirement are not met in, or are potentially inconsistent with, the design considerations of a conventional watch band. Prior designs of a wristband with an integral antenna either fail to address these considerations, or do so inadequately.

Accordingly, a need remains for a design for a wristband having a radio-receiver antenna incorporated therein, which is both suitable as a watchband and reliably functional as an antenna.

SUMMARY OF THE INVENTION

The invention is an improved wristband for a wristwatch-receiver, having first and second band portions each adapted for coupling at first ends thereof to a receiver housing and for coupling at opposed, second ends thereof to one another to encircle a wearer's wrist. The band portions include conductive elements extending lengthwise therein, first means for electrically coupling at least one of the conductive elements at the first or proximal end thereof to a receiver within the receiver housing, and second means for electrically coupling the conductive elements together at the second or distal ends thereof to form a continuous conductive loop within the wristband.

A preferred embodiment of a watchband according to the invention has several particular features: (a) the wristband has a metal antenna therein; (b) the antenna is insulated from the wearer's arm; (c) the antenna is substantially covered to avoid adverse electrical effects of contact with foreign objects; (d) the band includes an adjustable buckle to accommodate various size wrists; (e) the buckle is able to make conductive contact with the internal metal antenna through openings in the insulating covering at various points along the length of the band. Preferably, the inner side of the band has a grid pattern of transverse ridges so that it is not flat against the skin of the wearer. The two portions of the band are arranged to slide over each other easily (not constrained by the ridges) when the band is being adjusted.

The foregoing and other objects, features and advantages of the invention will become more readily apparent from the detailed description of a preferred embodiment which proceeds with reference to the accompanying drawings.

DETAILED DESCRIPTION

Figure 1:
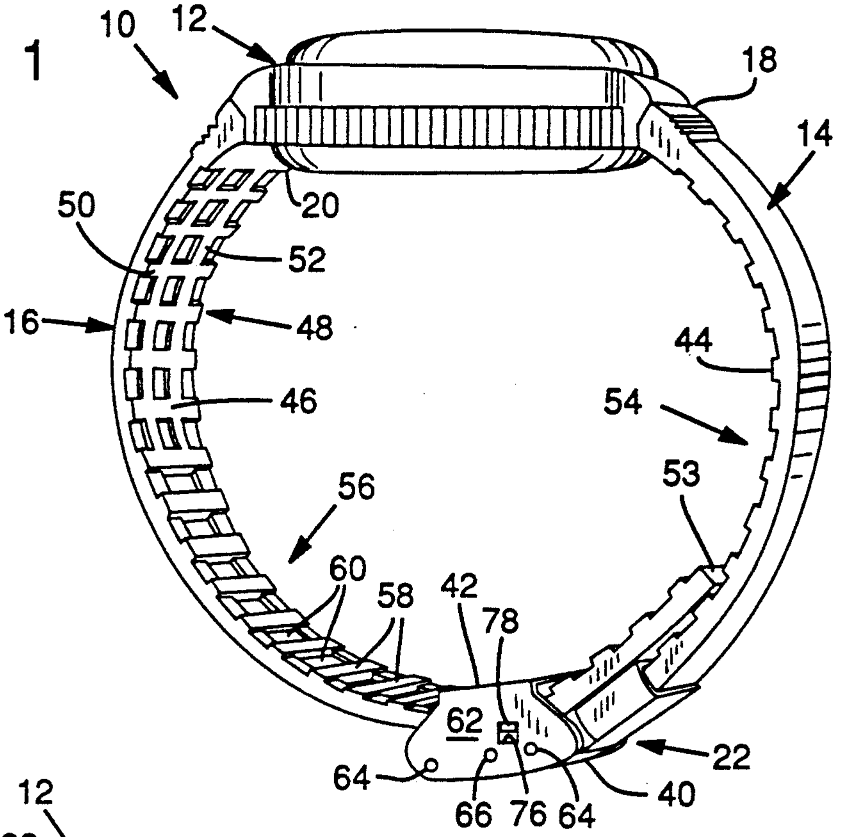
FIG. 1 is a perspective view of a watch-receiver having a watchband embodying a preferred embodiment of the present invention.

Referring to FIG. 1, a wrist-mounted paging receiver 10 includes a radio receiver or combination timepiece/receiver (not shown) housed within a receiver case 12 mounted on a wristband arranged to encircle a wearer's wrist. The receiver case is made of an insulative material such as injection molded rigid plastic. The wristband comprises elongated first and second wristband portions 14, 16, each adapted to fit part way around a wearer's wrist. The wristband portions have first or proximal ends 18, 20 mechanically connected to opposite sides of case 12 and second or distal ends interconnected in overlapping relationship by means of a conductive metal buckle or clasp 22. As indicated in FIGS. 3 and 4 and further described below, the clasp comprises two portions 22A and 22B, respectively.

Figure 2:
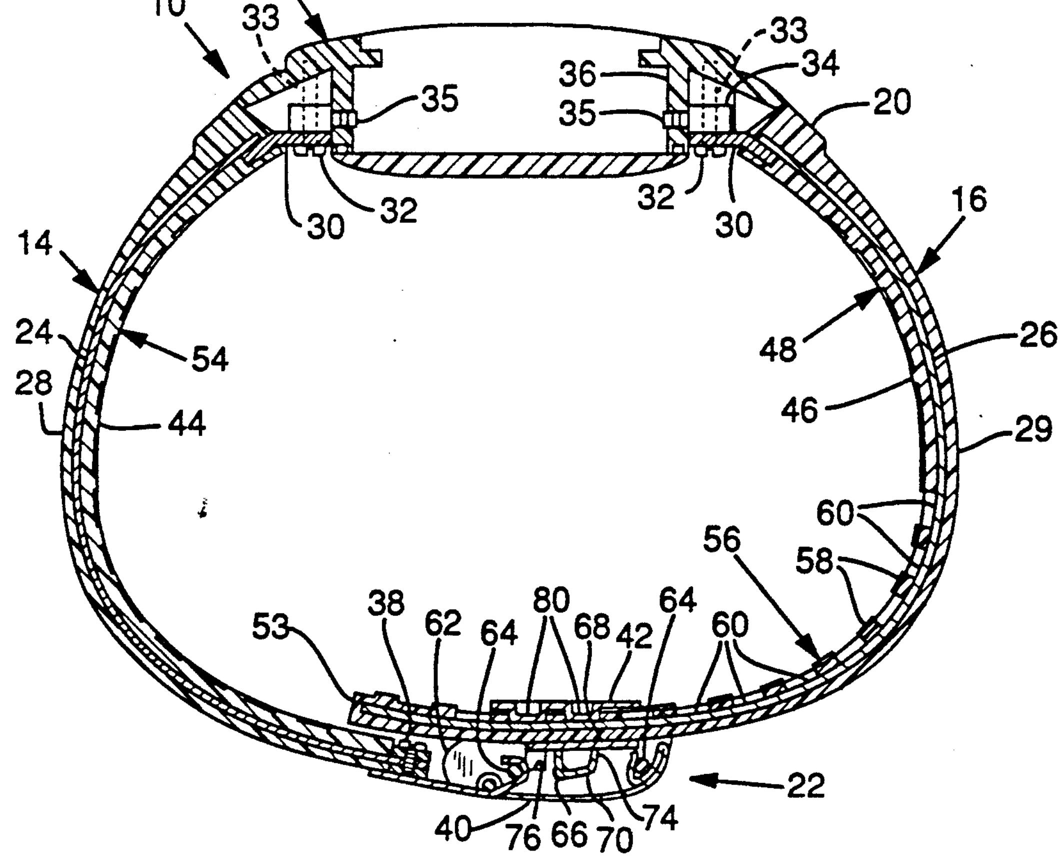
FIG. 2 is a cross-sectional view taken longitudinally of the wristband of FIG. 1.
Figures 3, 4, 5:
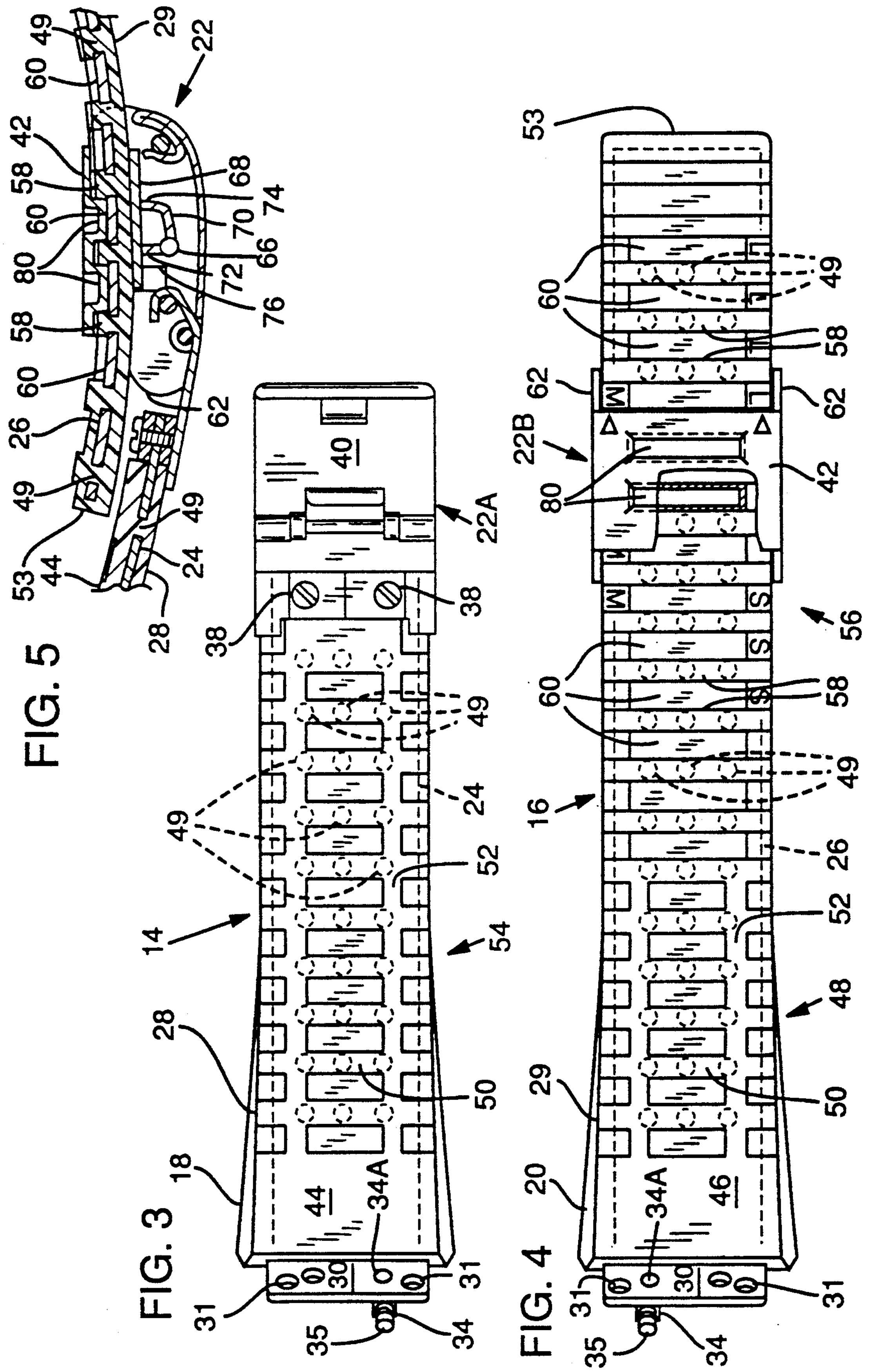
FIGS. 3 and 4 are inner-side plan views of the two portions of the wristband of FIG. 1.
FIG. 5 is an enlarged view of a portion of the wristband of FIG. 2, showing details of the clasp thereof.

Referring to FIGS. 2–4, the first and second wristband portions 14, 16 respectively include elongate first and second conductive strips 24, 26, generally enclosed within insulative covers 28, 29 and conductively coupled together by clasp 22. The strips are preferably formed of thin resilient strips of a suitable metal (e.g., stainless steel). Both portions 22A and 22B of the clasp are made of metal (e.g., stainless steel) selected to provide electrical continuity between the strips 24, 26 and optimum reception of radio frequency signals. The metal selected for the clasp and the conductive strips can vary but should not be subject to surface corrosion or oxidation (such as copper or aluminum), which would interfere with radio frequency surface conductivity and conductivity at their points of interconnection. The outer surface of the metal strips should also be smooth to minimize the effective length along which the received RF signal must travel to the receiver.

The conductive strips each extend to the first ends 18, 20 of their respective wristband portions, at which the strips are welded to obtusely angled, rectangular mounting brackets 30. A pair of screws 32 are threaded through a pair of holes 31 in each bracket 30 into internal screwholes 33 in each side of the case. A signal conducting member 34 is conductively connected to each bracket, e.g., by means of a rivet 34A. Each signal conducting member has a cylindrical leg 35 which protrudes through a sidewall 36 of the housing to contact an electrical receiving circuit input terminal (not shown) in the radio receiver.

The overall latching structure of the metal clasp 22 is conventional but its manner of providing both adjustability and electrical continuity between the conductive strips 24, 26 that form the antenna is novel. The distal end of the first strip 24 is fixedly and conductively connected by a bracket and screw assembly 38 to clasp portion 22A which includes a hinged hook or closure member 40. A distal portion of the second strip 26 is adjustably received in portion 22B of clasp 22, which includes a longitudinally movable contact member 42 further described below. Before further describing the clasp structure, it is necessary to further describe the structure of band portions 14, 16.

The covers 28, 29 are formed of a nonconductive material, e.g., molded flexible plastic compatible with human skin contact, to insulate the antenna from the wearer's skin and avoid adverse electrical effects from contact with foreign objects, which would detune the antenna. The insulative covers 28, 29 each have a solid or unbroken outer layer which insulatively encloses the outside surfaces of each of the conductive strips 24, 26. Cover 28 has an inner layer 44 which fully insulatively covers the inner side of the first conductive strip 14, except for the ends thereof, which are connected to metal brackets 30, 38. The cover of the second strip 26 has an inner layer 46 which insulatively covers a proximal portion of strip 26, generally indicated by reference numeral 48. The inner and outer layers are integrally interconnected by cylindrical plastic connectors 49 (see FIGS. 3-5) which extend through transversely-arranged trios of circular holes spaced periodically along each of the conductive strips 24, 26.

The inner layer 46 is patterned with a regular array of rectangular indentations to define a series of spaced transverse and longitudinal raised grid members or ridges 50, 52. This pattern facilitates ventilation of a wearer's wrist as contacted by the inner surface of the wristband. The entire inner surface 54 of the first band portion 14 is similarly patterned. Longitudinal ridges 52 further aid in mounting the wristband on the wearer's wrist by guiding the distal end 53 of band portion 16 over the transverse ridges 50 on the inner surface of band portion 14.

The inside surface of distal portion 56 of band portion 16, along which clasp portion 22B is adjustably positionable, is patterned by only transverse ridges 58. The transverse ridges are positioned to overlie the connectors 49 that interconnect the outer and inner layers of the cover. Transverse segments of the inner surface 60 of conductive strip 26 are exposed between the transverse grid members.

Electrical contact and adjustability are simultaneously provided between the second clasp member 22B and strip 26 by means of a novel clamping structure, best seen in FIGS. 4 and 5. This clamping structure has a pair of opposite sidewalls 62 interconnected by movable contact member 42, which spans the width of the band portion 16 along the inner side thereof. The sidewalls support a pair of transverse latch pins 64 for hook member 40 to engage (see FIG. 2), and a transverse adjustment locking hinge pin 66 centered longitudinally over movable contact member 42. A rectangular clamping member 68 is sized and positioned between sidewalls 60 to span the width of the band portion 16 along the outer side thereof, opposite movable contact member 42.

A locking member 70 having a generally U-shaped cross-section is rotatably mounted on pin 66 for biasing member 68 in an over-center camming action against member 42 to clamp the band portion therebetween, as shown in FIG. 2. The locking member is rotatable about one side 72 thereof, through which pin 66 is received, to an unlocked position in which both sides 72, 74 of member 70 are out of clamping contact with member 68. In this position, member 68 floats freely between sidewalls 62, retained only by ears 78, positioned to extend through a pair of opposed openings 76 in the sidewalls (see FIG. 1).

Movable contact member 42 includes a pair of indented rectangular cogs or contact elements 80, preferably die-stamped into the underside of member 42. These elements protrude between the transverse grid members 58, to contact the exposed segments of inner surface 60 of metal strip 26 when clamped. When unclamped, member 68 permits sufficient clearance for the contact elements 80 to clear the transverse ridges 58 so that clasp portion 22A can be slid lengthwise along band portion 16 to facilitate adjustment. This requires that the locking member be arranged to provide clamping member 68 a range of motion between its clamped and released positions which is at least the protrusion length of contact element 80. Indicia L, M and S molded into the inner surface of the cover 29 indicate various positions for clasp portion 22B to be adjusted to fit large, medium and small wrist sizes, respectively.

Having illustrated and described the principles of my invention in a preferred embodiment, it should be apparent that the invention can be modified in arrangement and detail without departing from the principles thereof.

I claim all modifications coming within the spirit and scope of the following claims:

1. A wristband for a wrist-mounted radio receiver mounted in a case, said wristband comprising:

first and second elongated conductive strips, each adapted to fit part way around a wearer's wrist and having inside and outside surfaces, each of said strips having first and second lengthwise ends;

means for mechanically connecting the first end of each of said strips to opposite sides of said case;

a first insulating layer covering the outside surface of each of said strips, a second insulating layer covering the inside surface of each of said strips;

one of said insulating layers covering said second conductive strip having openings periodically exposing portions of one of the surfaces along a portion of the length of said conductive strip;

a clasp for interconnecting the second end of each of said conductive strips and securing the second ends together in a selected longitudinal overlapping relationship, said clasp having first and second parts, said first part being attached to the second end of said first strip, and second part being attached adjustably at a plurality of positions along said portion of the length of said second strip; and a conductive cog protruding from the second part of the clasp toward the second conductive strip for making electrical contact between the second part of the clasp and one of said surfaces of the second conductive strip through one of said openings in the insulating layer, said contact being made through a different one of said openings at each of said plurality of positions;

so that the length of the wristband can be adjusted while maintaining electrical contact between the overlapping second ends of the first and second conductive strips by changing the opening through which said second part of said clasp makes electrical contact with the second conductive strip.

2. A wristband according to claim 1 in which the second insulating layer has longitudinal and transverse ridges on the inside of at least one section so that the sections remain away from the user's skin and nevertheless slip over each other as the band is being adjusted.

3. A wristband according to claim 1 in which the openings are positioned along the second insulating layer of the second conductive strip and the cog for making electrical contact between the second part of the clasp and the second conductive strip being positioned to contact the inside surface of the second conductive strip.

4. A wristband according to claim 1 in which the second part of the clasp includes a clamping means for releasably clamping the second strip therein, the clamping means including two of said conductive cogs, each positioned to protrude inward through a selected pair of said openings in the insulating layer to contact the conductive strip.

5. A wristband according to claim 1 in which the openings and conductive cog are positioned for making electrical contact along the inside surface of a distal portion of the second strip.

6. A wristband according to claim 1 in which the means for mechanically coupling the first end of each strip to the case includes means for coupling an electrical signal from the strips through the case to a radio receiver circuit positioned inside the case.

7. A wristband according to claim 1 in which the conductive strips and clasp include a highly conductive surface for conduction of radio frequency signals.

8. A wristband according to claim 1 in which the outside surfaces of the conductive strips are substantially flat.

9. A wristband according to claim 1 in which the first and second insulating layers are integrally formed of a flexible polymeric material.

10. A wristband according to claim 1 in which the first and second insulating layers are integrally interconnected through a plurality of openings in each of the conductive strips.

11. An adjustable-length wristband for a wristwatch-receiver, comprising:

first and second band portions each sized to extend part way around a wearer's wrist;

means for mechanically coupling the band portions at proximal ends thereof to a receiver housing;

a clasp arranged for mechanically coupling distal end portions of the band portions to one another in lengthwise adjustable overlapping relationship to encircle a wearer's wrist; each band portion including a flexible metal strip extending lengthwise therein and an inside and outside insulative layer covering each metal strip;

first means for electrically coupling the conductive strips at the proximal ends thereof to a receiver within the receiver housing; and second means in the clasp for electrically coupling the distal end portions of the conductive strips together at a plurality of selectable lengthwise positions along the first band portion to form a continuous conductive loop antenna within the wristband;

the insulative layer covering the first band portion including a plurality of openings spaced along the distal portion thereof, each opening exposing a segment of an inside or outside surface of the covered metal strip;

the second means including a conductive contact element arranged to protrude through at least one of the openings to electrically contact the surface segment of the metal strip exposed within the opening; and the clasp including a releasable clamping means for selectably clamping and releasing the first band portion to permit adjustment of the wristband, the clamping means being operative to engage the contact element within the opening when clamped and to allow the contact element to disengage from the opening when released.

12. A wristband according to claim 11 in which the openings are spaced periodically along the insulative layer of the first band portion.

13. A wristband according to claim 12 in which the contact element includes two conductive protrusions spaced to fit simultaneously into two of said openings.

14. A wristband according to claim 11 in which the openings and the contact element are positioned along the inside insulative layer, said layer and openings defining a series of periodically spaced transverse ridges along said distal portion.

15. A method of providing a continuous loop-type antenna in an adjustable wristband, the method comprising:

forming first and second elongated, flexible metal strips of a length sufficient to partly encircle a wearer's wrist, each of the strips having inside and outside surfaces and first and second lengthwise ends;

enclosing the metal strips in an insulative covering having inner and outer layers covering the inside and outside surfaces of the strips;

connecting the first ends of the strips to opposite sides of a wrist-mountable case;

interconnecting the second ends of the insulatively covered strips in a selected longitudinal overlapping relationship with a two-part metal clasp having a first clasp portion connected electrically and mechanically to the second end of the first strip and a second clasp portion including a releasable clamp on a distal end portion of the second strip adjacent its second end over the insulative covering for adjustable positioning lengthwise therealong;

forming a series of periodically spaced openings in one of the insulative layers along the distal end portion of the second strip to expose spaced segments of the inside or outside surface of the second strip;

forming a conductive cog protruding from the releasable clamp of the second clasp portion toward the second conductive strip for engaging at least one of the spaced openings to contact the exposed surface segment at a selected longitudinal position along the second strip when clamped and disengaging from the openings when the clamp is released to reposition the clasp longitudinally along the second strip.

16. A method of providing a continuous loop-type antenna in an adjustable wristband, the method comprising:

forming first and second elongated, flexible metal strips of a length sufficient to partly encircle a wearer's wrist;

enclosing the metal strips in an insulative covering having inner and outer layers;

providing a two-part metal clasp having a first clasp portion connected electrically and mechanically to a distal end of the first strip and a second clasp portion including a releasable clamp on a distal end portion of the second strip over the insulative covering for adjustable positioning lengthwise therealong;

forming a series of periodically spaced openings in one of the insulative layers along a distal end portion of the second strip to expose spaced segments of the surface of the second strip;

forming a conductive protruding element in the releasable clamp of the second clasp portion for engaging at least one of the spaced openings to contact the exposed surface segment at a selected position along the second strip when clamped and disengaging from the openings when the clamp is released to reposition the clasp;

enclosing the metal strips with an insulative covering includes molding a flexible polymeric material around the strips to integrally form the inner and outer layers and said openings.

17. A method according to claim 16 including molding a grid pattern of longitudinal and transverse ridges into an exposed surface portion of the inner layer.

18. A method according to claim 16 including forming a series of holes spaced along the length of each of the metal strips prior to the molding step so that the inner and outer layers are integrally interconnected, the holes being spaced longitudinally between the openings in the insulative layer.

19. A method according to claim 16 including forming the metal strips and clasp with a corrosion and oxidation resistant conductive surface.

20. An adjustable-length wristband for a wristwatch-receiver, comprising:

first and second band portions each sized to extend part way around a wearer's wrist;

means for mechanically coupling the band portions at proximal ends thereof to a receiver housing;

a clasp arranged for mechanically coupling distal end portions of the band portions to one another in lengthwise adjustable overlapping relationship to encircle a wearer's wrist;

each band portion including a flexible metal strip extending lengthwise therein and an inside and outside insulative layer covering each metal strip;

first means for electrically coupling the conductive strips at the proximal ends thereof to a receiver within the receiver housing; and second means in the clasp for electrically coupling the distal end portions of the conductive strips together at a plurality of selectable lengthwise positions along the first band portion to form a continuous conductive loop antenna within the wristband;

each of the conductive strips have a plurality of separate holes spaced along their length;

the first and second insulating layers being integrally formed of a flexible polymeric material and being integrally interconnected by polymeric connectors extending through said holes.

* * * * *

UNITED STATES PATENT AND TRADEMARK OFFICE

CERTIFICATE OF CORRECTION

PATENT NO. : 5,179,733

DATED : January 12, 1993

INVENTOR(S) : Shigeru Matsui

It is certified that error appears in the above-indentified patent and that said Letters Patent is hereby corrected as shown below:

Column 8 Line 3, change "16" to --15--.

Signed and Sealed this

Eighth Day of March, 1994

Attest:

BRUCE LEHMAN

*Attesting Officer* *Commissioner of Patents and Trademarks*